US007076123B2

(12) United States Patent
Kirkpatrick et al.

(10) Patent No.: US 7,076,123 B2
(45) Date of Patent: Jul. 11, 2006

(54) OPTOELECTRONIC PACKAGE HAVING A TRANSMISSION LINE BETWEEN ELECTRICAL COMPONENTS AND OPTICAL COMPONENTS

(75) Inventors: Peter E. Kirkpatrick, Berkeley, CA (US); Jean-Marc Verdiell, Palo Alto, CA (US); Craig Schulz, Fremont, CA (US); Marc Epitaux, Sunnyvale, CA (US); Rickie C. Lake, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 141 days.

(21) Appl. No.: 10/209,337

(22) Filed: Jul. 30, 2002

(65) Prior Publication Data

US 2004/0022476 A1 Feb. 5, 2004

(51) Int. Cl.
*G02B 6/12* (2006.01)
(52) U.S. Cl. ....................................................... 385/14
(58) Field of Classification Search .................. 385/14, 385/92, 93, 16, 88, 75, 8–9
See application file for complete search history.

(56) References Cited

U.S. PATENT DOCUMENTS

| | | | | |
|---|---|---|---|---|
| 5,493,437 A | * | 2/1996 | Lebby et al. ............... | 398/139 |
| 6,310,700 B1 | * | 10/2001 | Betts ............................... | 359/2 |
| 6,485,192 B1 | * | 11/2002 | Plotts et al. ................... | 385/75 |
| 6,647,039 B1 | * | 11/2003 | Fu et al. ......................... | 372/36 |
| 6,807,065 B1 | * | 10/2004 | Sato ............................ | 361/780 |
| 2002/0140092 A1 | * | 10/2002 | Nakanishi et al. ........... | 257/734 |
| 2002/0168152 A1 | * | 11/2002 | Abe et al. ..................... | 385/88 |
| 2003/0091303 A1 | * | 5/2003 | Kami et al. ................... | 385/92 |
| 2003/0142929 A1 | * | 7/2003 | Bartur et al. ................. | 385/92 |
| 2003/0206703 A1 | * | 11/2003 | Chiu et al. .................... | 385/93 |
| 2004/0053014 A1 | * | 3/2004 | Sato ......................... | 428/195.1 |

* cited by examiner

Primary Examiner—Frank G. Font
Assistant Examiner—Eric Wong
(74) Attorney, Agent, or Firm—Rick D. Boyd

(57) ABSTRACT

Described herein is a hermetic fiber optic package that may have a wide bandwidth radio frequency (e.g., between 9 kHz and 300 GHz) interface and a multilayer substrate provides a platform to integrated various components such as, for example, integrated circuits having electronic components, optoelectronic components, or optics. In one embodiment, the substrate has a wide bandwidth surface mountable interface that may be a single ended or a differential that allows for an electrical signal to pass from the exterior of the package to the interior. The interior of the package contains a "riser" that is used to bring an electrical signal from the plane of the substrate to the plane close to the optical axis. This riser includes a transmission line to achieve the change in height. The transmission line can be single ended or differential. Also within the package is a "submount" upon which electrical/optical/electro-optic components can be integrated.

36 Claims, 10 Drawing Sheets

MINI-DIL 2.5Gb/s TRANSMITTER 150

BUTTERFLY CAN 10Gb/s TRANSMITTER 100

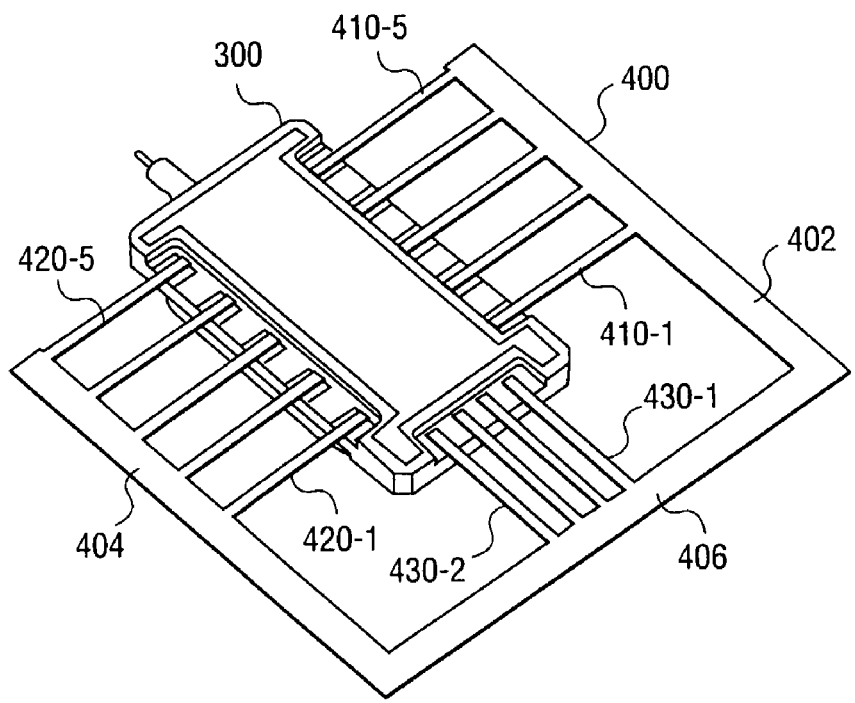
FIG. 3 OPTICAL PACKAGE (BACKSIDE VIEW) 200
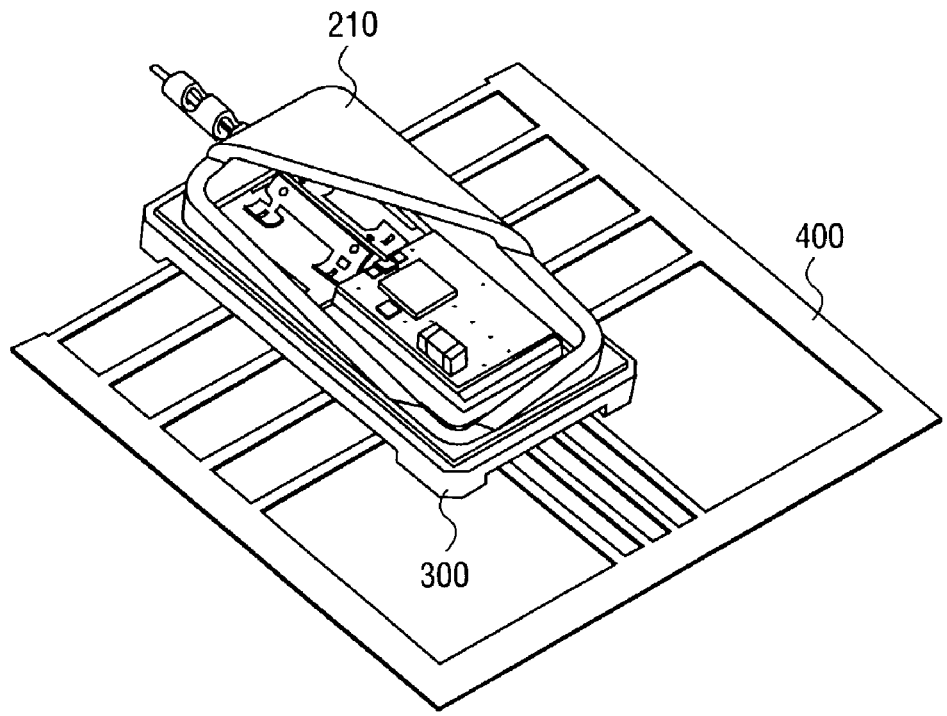
FIG. 4 OPTICAL PACKAGE (TOP SIDE VIEW) 200

SUBSTRATE RF SIGNAL PATH LAYER 330

SUBSTRATE DC SIGNAL PATH LAYER 350

SUBSTRATE TOP SURFACE METAL LAYER 370

CUTAWAY VIEW OF MTx (MINI TRANSMITTER) 500

OPTOELECTRONIC PACKAGE HAVING A TRANSMISSION LINE BETWEEN ELECTRICAL COMPONENTS AND OPTICAL COMPONENTS

TECHNICAL FIELD

The invention relates to optoelectronic packaging. More specifically, the invention relates to an optoelectronic component package having a transmission line between a high frequency interface on a first plane and optical components on a second plane in the component package.

BACKGROUND

As optical components have become increasingly integrated with electronic components, packages for optoelectronic devices have been developed. Individually, optical component packages and electronic component packages have been designed to solve different packaging problems. For example, optical components must be carefully aligned and the alignment must be maintained for proper functionality. Electronic components often require heat dissipation elements to maintain the electronic device in a predetermined operating temperature range.

In order to provide an interface between optical components and electronic components to utilize the bandwidth provided by fiber optics, it is necessary to provide devices which can perform optical to electric, as well as electrical to optical conversion and to pass signals between the electronic and optical domains. Current packages typically have a coaxial radio frequency (RF) interface or ceramic leaded interface. An alternative package is the miniature dual in-line (MINI-DIL) package, which is a ceramic can with ceramic walls and vertical leads.

Devices such as the butterfly package as well as the MINI-DIL package are configured according to a can shape that have various sidewalls. As a result, these devices are not capable of providing a planar platform for optical components, including optical transducers, transponders or the like. Moreover, the configuration of such devices does not enable product fabrication utilizing such techniques as machine vision.

FIG. 1 illustrates a butterfly/can package known in the art. When configured as a transmitter, the butterfly/can package of FIG. 1 includes components to convert electrical signals into optical signals and to transmit the optical signals. Another package that can be used to encapsulate electrical and optical components is the MINI-DIL package, which is illustrated in FIG. 2.

BRIEF DESCRIPTION OF THE DRAWINGS

The invention is illustrated by way of example, and not by way of limitation, in the figures of the accompanying drawings in which like reference numerals refer to similar elements.

FIG. 3 illustrates one embodiment of an optical package having a backside recessed connection.

FIG. 4 illustrates a top side view of one embodiment of the optical package of FIG. 3.

DETAILED DESCRIPTION

Figure 2:
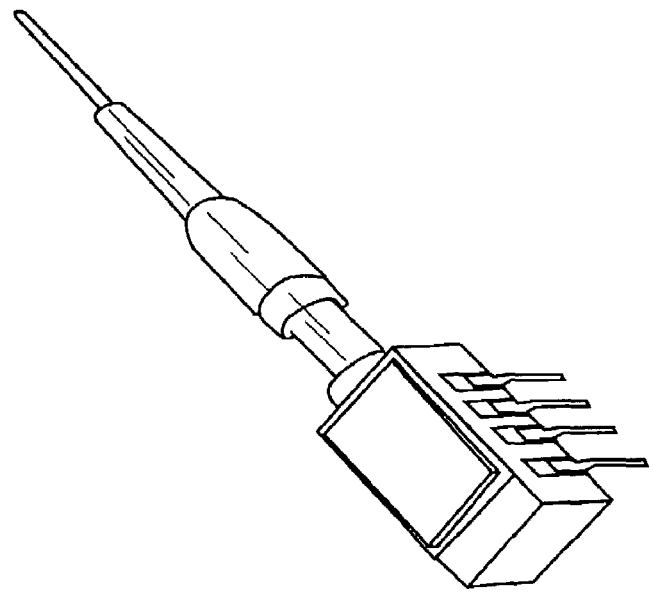
FIG. 2 illustrates a MINI-DIL package known in the art.
Figure 1:
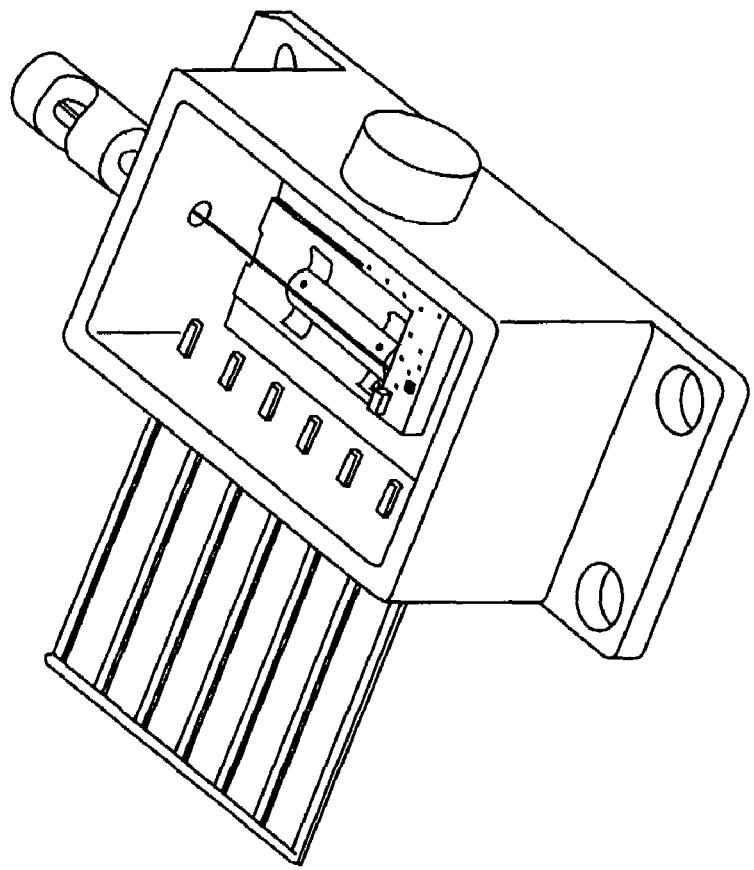
FIG. 1 illustrates a butterfly/can package known in the art.

Optical component packages having a transmission line to couple optical components to electrical components are described.

In the following description, for purposes of explanation, numerous specific details are set forth in order to provide a thorough understanding of the invention. It will be apparent, however, to one skilled in the art that the invention can be practiced without some of these specific details. In other instances, structures and devices are shown in block diagram form in order to avoid obscuring the invention.

Overview

Described herein is a hermetic optoelectronic package that may have a wide bandwidth (e.g., >15 GHz) radio frequency (RF) interface. In one embodiment, a multilayer cofired ceramic (e.g., Alumina/Aluminum Nitride) substrate provides a platform to integrate various components such as, for example, integrated circuits having electronic components, optoelectronic components (e.g., laser diodes, photodetectors), or optical components (e.g., isolators, fiber optic couplers, fibers, lenses). In one embodiment, the substrate has an interface that allows for an electrical signal to pass from the exterior of the package to the interior. Note that in different embodiments, signals can pass both directions, e.g., in a transmitter, the electrical signal passes from the exterior to the interior, and in a receiver, the electrical signal passes from the interior to the exterior. The substrate can have a seal ring attached that provides for a hermetic seal to a cap/lid through soldering or laser welding.

Atop the substrate is a "riser" that is used to bring an electrical signal from the plane of the substrate to the plane close to the optical axis of the package (i.e., the height at which light is emitted by a laser diode or received by a photodetector). This riser includes a transmission line to transmit signals from the plane of the electrical signal to the optical components. The transmission line can be single ended or differential. Also within the package is a "submount" upon which electrical/optical/electro-optic components can be integrated, for example, laser diodes, monitor photodiodes, photodetectors, driver amplifiers, transimedance amplifiers, capacitors, inductors, thermistors. Patterning on the submount is used to route the various electrical signals including transmission lines to bring the electrical signal from the riser to the various components.

Package Configuration

FIG. 3 illustrates one embodiment of an optical package having a backside recessed connection. Lead frame 400 is coupled to recessed portions of optical package substrate 300. Backside surface of the optical package includes recessed portions, which enable coupling of leads 410, 420 and 430 to reduce the air gap between the lead frame and a printed circuit board (PCB) or other component within the package.

In one embodiment, the optical package connection includes a recessed, intermediate layer for attaching leads 410, 420 and 430, which couples the package to a printed circuit board (PCB) for receiving electrical signals. The recessed configuration of the package increases the space available for mounting optoelectronic components to a top surface of substrate 300. In addition, the recessed configuration provides a flat surface on a backside of the package, which improves thermal dissipation. Moreover, the recessed package configuration increases available system space by eliminating coaxial connections for receiving or transmitting signals.

FIG. 4 illustrates a top side view of one embodiment of the optical package of FIG. 3. Substrate 300 includes the recessed portions on an end opposed to the optical fiber (the opposed end). Along a top surface of the optical package, cap 210 is coupled to this top surface in order to encapsulate optical and/or electrical components.

Internal Configuration

Figure 5:
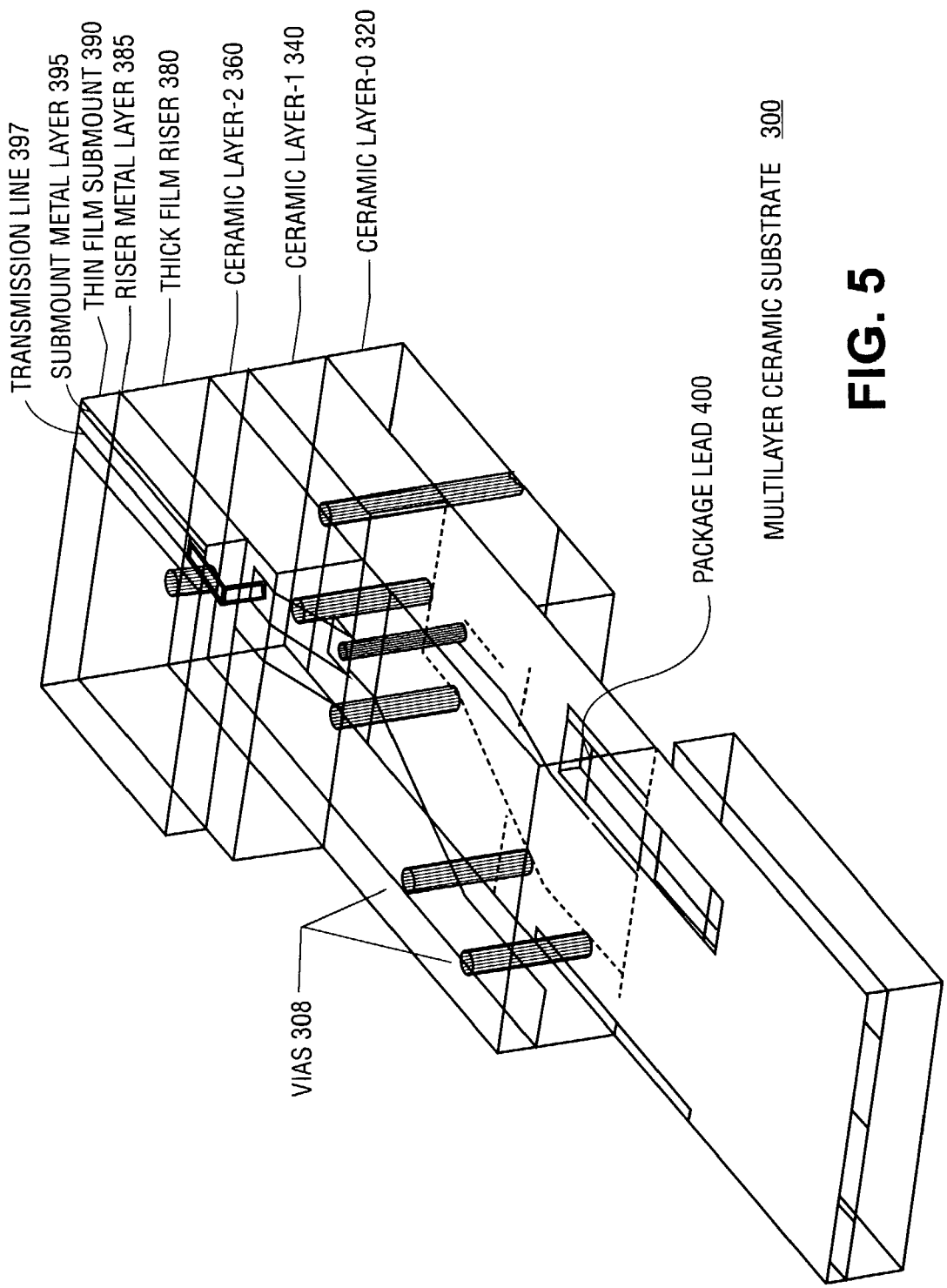
FIG. 5 illustrates one embodiment of a multilayer substrate of the package of FIGS. 3 and 4.

FIG. 5 illustrates one embodiment of a multilayer substrate of the package of FIGS. 3 and 4. In one embodiment, the multilayer substrate includes layer 320, layer 340 and layer 360; however, a different number of layers can be used. In one embodiment, three ceramic layers are coupled together utilizing one or more vias 308. In one embodiment, the multilayer substrate 300 is a cofired, multilayer ceramic substrate.

In one embodiment, multilayer substrate 300 includes riser 380, as well as submount 390. Riser 380 can be, for example, a thick film riser and submount 390 can be a thin film submount. In one embodiment, a riser metal layer 385 is provided between riser 380 and submount 390. In addition, a submount metal layer 395 is formed on a top surface of submount 390. Once formed, a patterned transmission line 397 is formed to provide a RF signal path to the components that reside on a top surface of submount 390. In one embodiment, a vertical transmission line provides an interconnection between the electronic components on one plane with optical components on a second plane. In one embodiment, the transmission line is out of the plane of the submount (perpendicular in this case where it is vertical with respect to the submount (e.g., 45 degrees)). In this case, the transmission line can be a truly coplanar line (GSG or GSSG), with no separate ground. While specific layers and/or materials have bee used with respect to FIG. 5 and other descriptions, other materials and/or a different number of layers can be used.

A vertical transmission line provides several advantages. The vertical transmission line requires less space within the package as vias to accomplish the same result. In one embodiment, the vertical transmission line is printed on a vertical side of thick film riser 380 using a metal printing technique. Because vias through relatively thick layers can have an inconsistent thickness, the printed vertical transmission line can provide improved bandwidth.

Figure 6A:
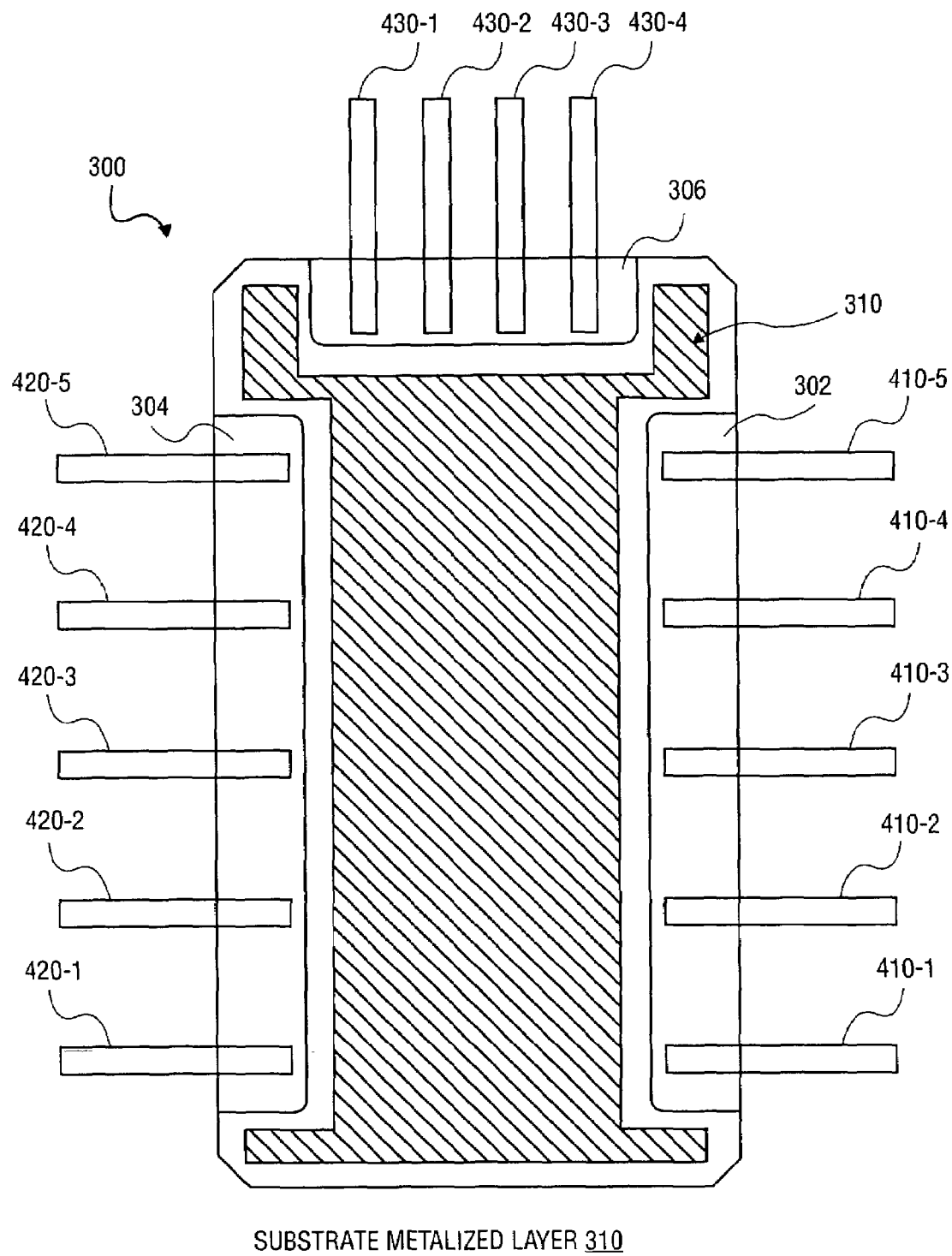
FIG. 6A illustrates one embodiment of a first ceramic layer of the multilayer substrate of FIG. 5.

FIG. 6A illustrates one embodiment of a first layer of the multilayer substrate of FIG. 5. In one embodiment, the layer of FIG. 6A includes a bottom surface 310, which is metalized ceramic in order to enable RF shielding as well as contact to a heat sink. Adjacent to substrate metalized layer 310, the recessed portions 302, 304 and 306 of the substrate enable coupling of leads 410, 420 and 430. Although the layer is illustrated with opposed recessed portions 302 and 304 and adjacent portion 306, different recessed portions of the layer may be made.

Figure 6B:
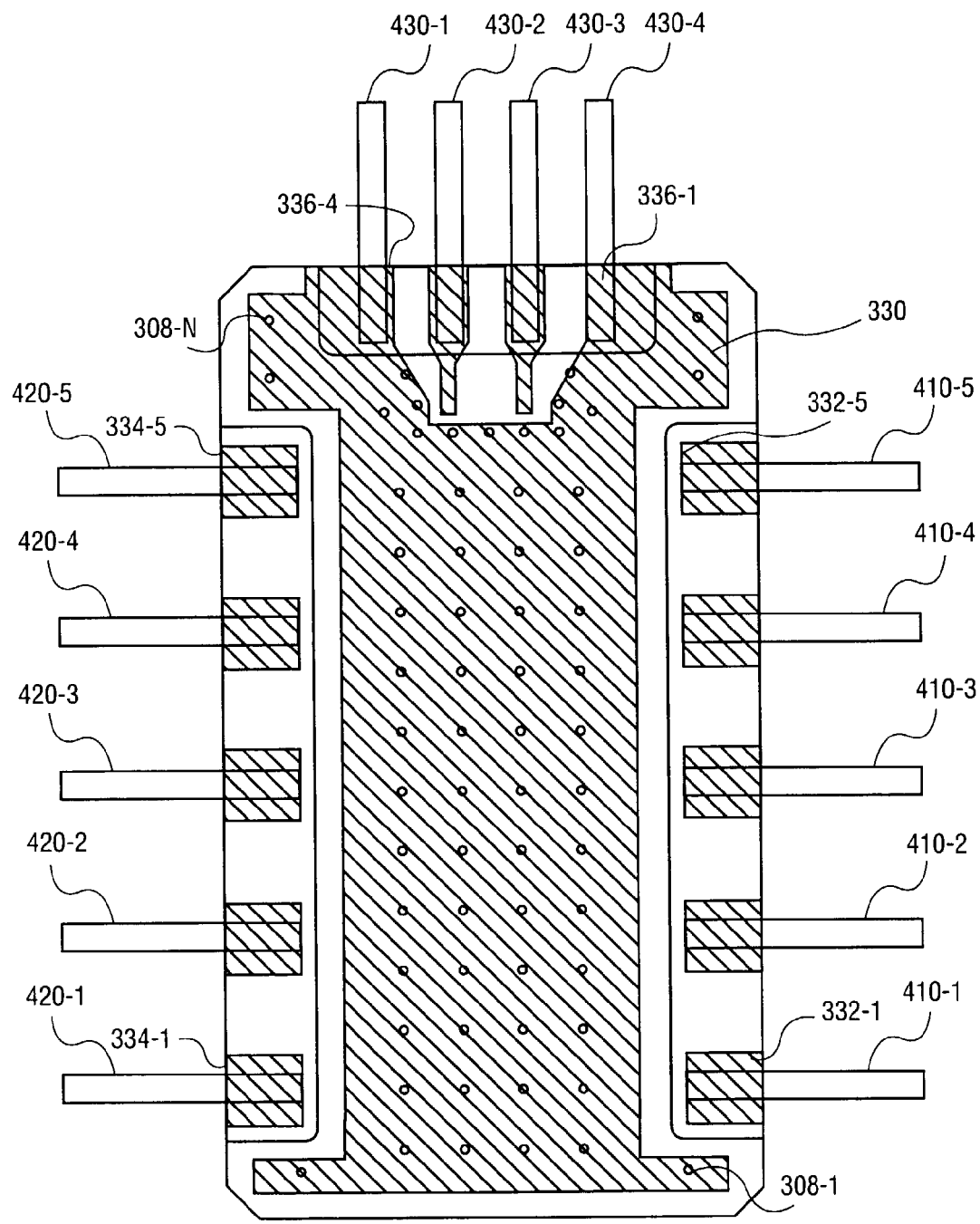
FIG. 6B further illustrates one embodiment of a layer of FIG. 5.

FIG. 6B further illustrates one embodiment of a layer substrate of FIG. 5. Layer 330 is metalized to provide an RF signal path from leads 430 to an interior of the substrate. In one embodiment, layer 330 includes a plurality of pads (332, 334 and 336) which are utilized to couple to leads 410 and 420. In addition, layer 320 includes a plurality of vias in order to couple the RF signal path layer 330 to the metalized substrate layer 310.

Figure 6C:
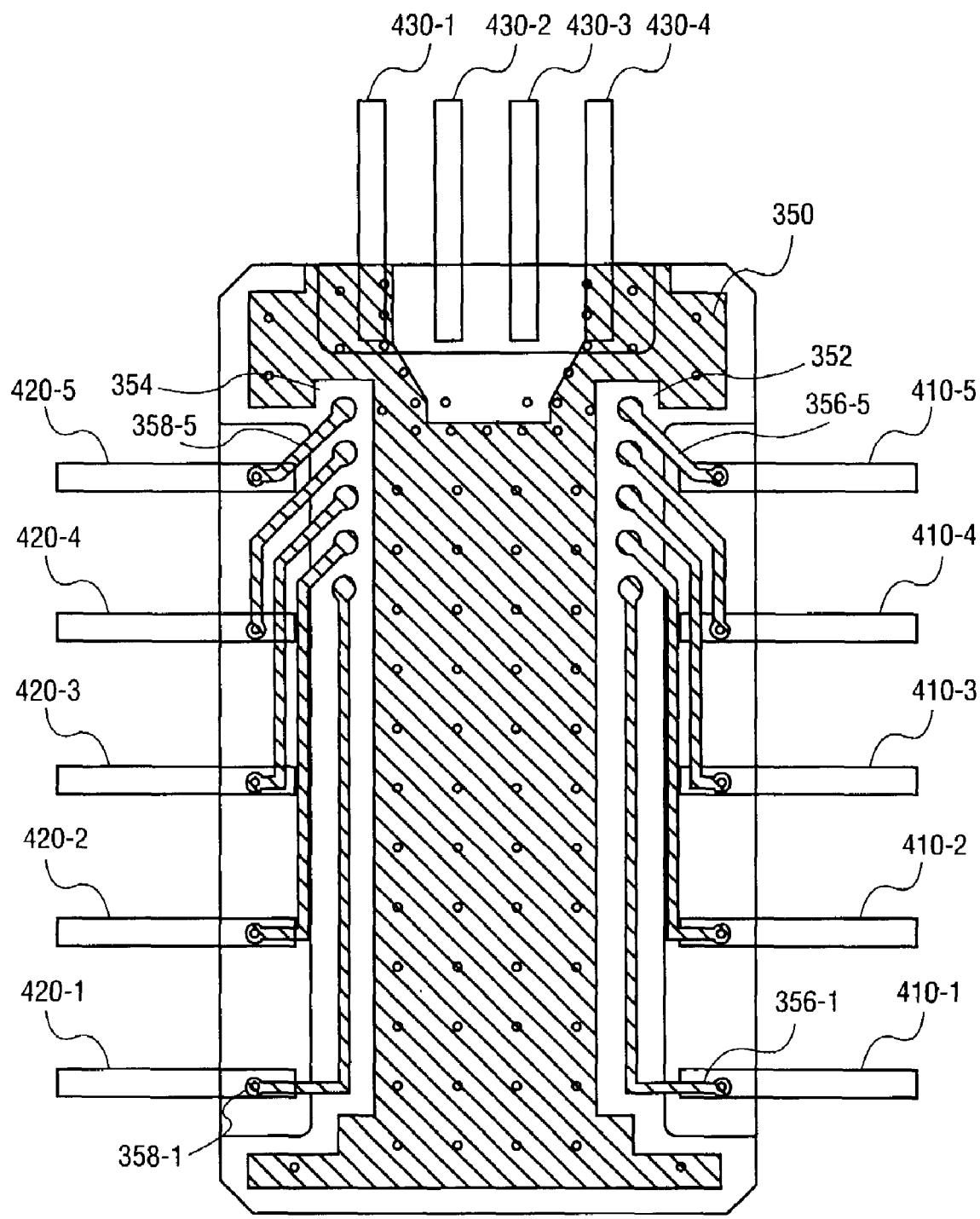
FIG. 6C illustrates one embodiment of a DC signal layer of the multi-level substrate.

FIG. 6C illustrates one embodiment of a direct current (DC) signal layer of the multi-level substrate. In one embodiment, the layer of FIG. 6C is fabricated to form DC signal path layer 350, which provides DC signal routing from bonding pads 342 and 344 to various leads 410 and 420. Wire bonds 346 couple leads 410 to bond pad 342. Likewise, bond pad 344 is coupled to leads 420 by wire bonds 348. In one embodiment, the layer of FIG. 6C is fabricated to form DC signal path layer 350, which provides DC signal routing from bonding pads 372 and 374 to various leads 410 and 420. Printed traces 356 and 358 and vias in layers 340 and 360 couple leads 410 and 420 to bond pads 372 and 374.

In one embodiment, layer 320 is fabricated to form the metalized layer 310 and RF signal path layer 330. Likewise, a top surface of layer 340 is fabricated to form the DC signal path layer 350 to leads 410, 420 and 430. In addition, a top surface of layer 360 is fabricated to form a top surface metal layer 370. In one embodiment, once each of the layers are metalized, the ceramic layers are cofired together to form the multilayer ceramic substrate 300.

Figure 6D:
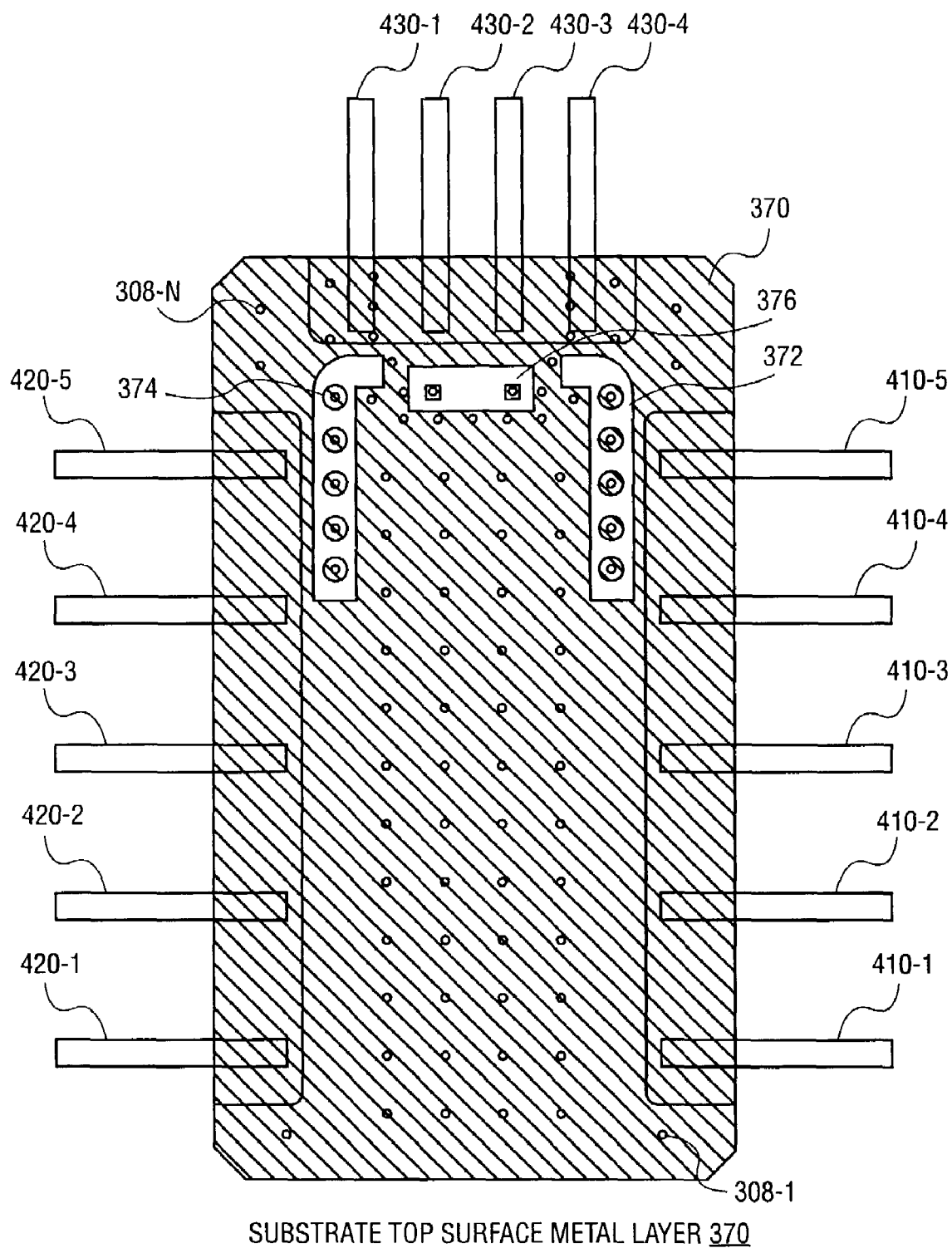
FIG. 6D illustrates one embodiment of a substrate top surface metal layer.

FIG. 6D illustrates one embodiment of a substrate top surface metal layer. Substrate top surface metal layer 370 enables formation of optoelectronic components onto a top surface of the substrate 300. The transmission line, patterned onto the riser, as well as a transmission line, patterned onto a metal layer 395 of submount 390, provide a signal path from the RF signal pads 376 to the optical electrical components mounted on top of the submount layer 395.

In one embodiment, the vertical transmission line is a metal pattern applied to the thick film riser. The vertical transmission line can be a single ended or differential transmission line. While only one vertical transmission line is described with respect to FIG. 6D, any number of vertical transmission lines can be provided.

Figure 7:
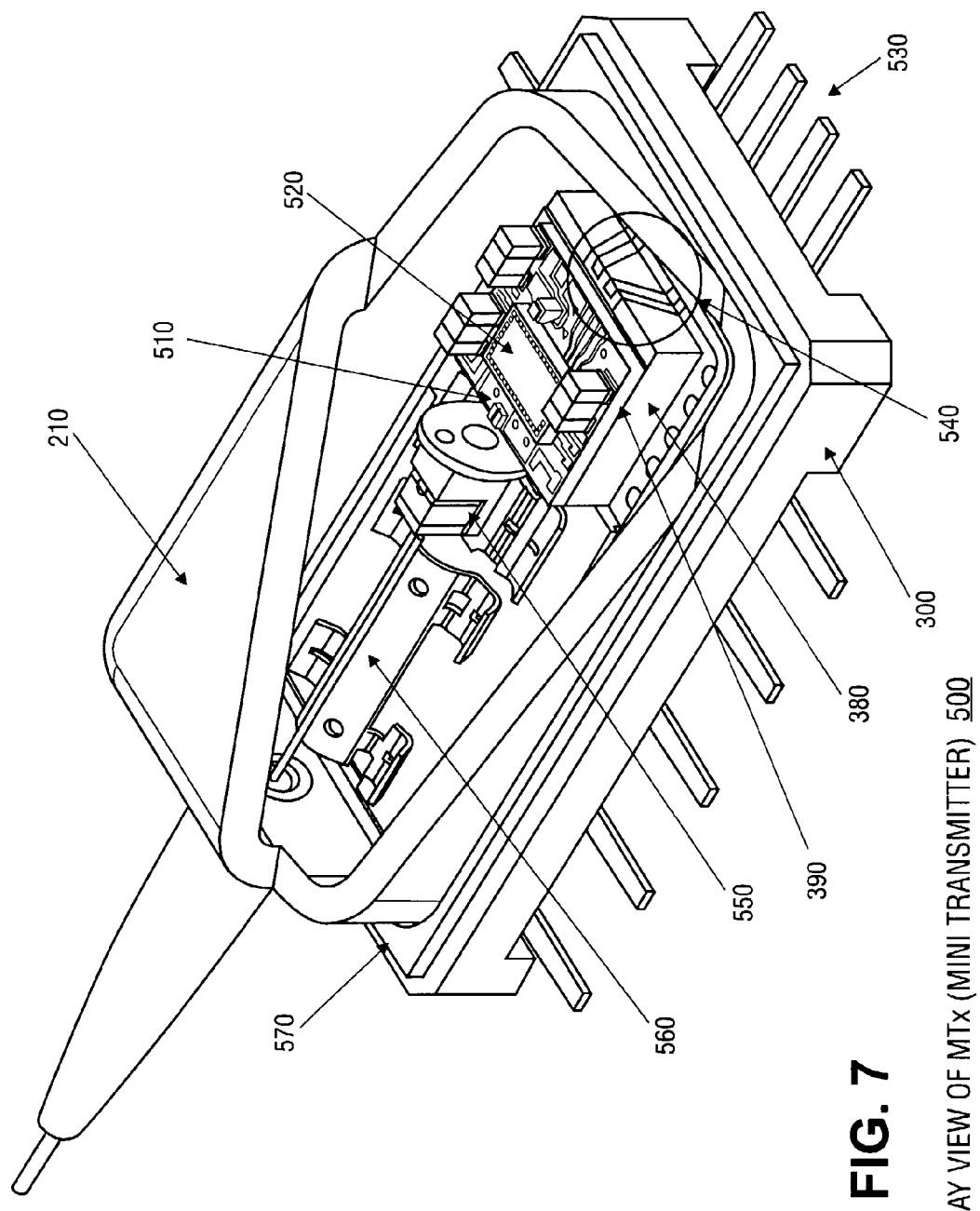
FIG. 7 illustrates one embodiment of a transmitter in a package having a vertical transmission line.

FIG. 7 illustrates one embodiment of a transmitter in a package having a vertical transmission line. In one embodiment, the transmitter package includes lid cap 210, which is hermetically sealed to the top surface of substrate 300. Seal ring 570 provides a hermetic seal between substrate 200 and lid cap 210. Riser 380, as well as submount 390, are further coupled to a top surface of the substrate 300. Riser 380 and submount 390 enable vertical transmission line 540 to provide signal paths for RF interface 530. The transmitter further includes optoelectronic component 510, which can be any type of optoelectronic component, for example, a laser diode.

To provide the optical transmission, the transmitter 500 further includes an optical component 550 that transmits optical signals using fiber/flexure 560. Conversely, the transmitter 500 is converted into a receiver by utilizing a semiconductor detector as the optoelectronic components and a transimpedance amplifier as electrical IC 520.

Example System Applications

Figure 8:
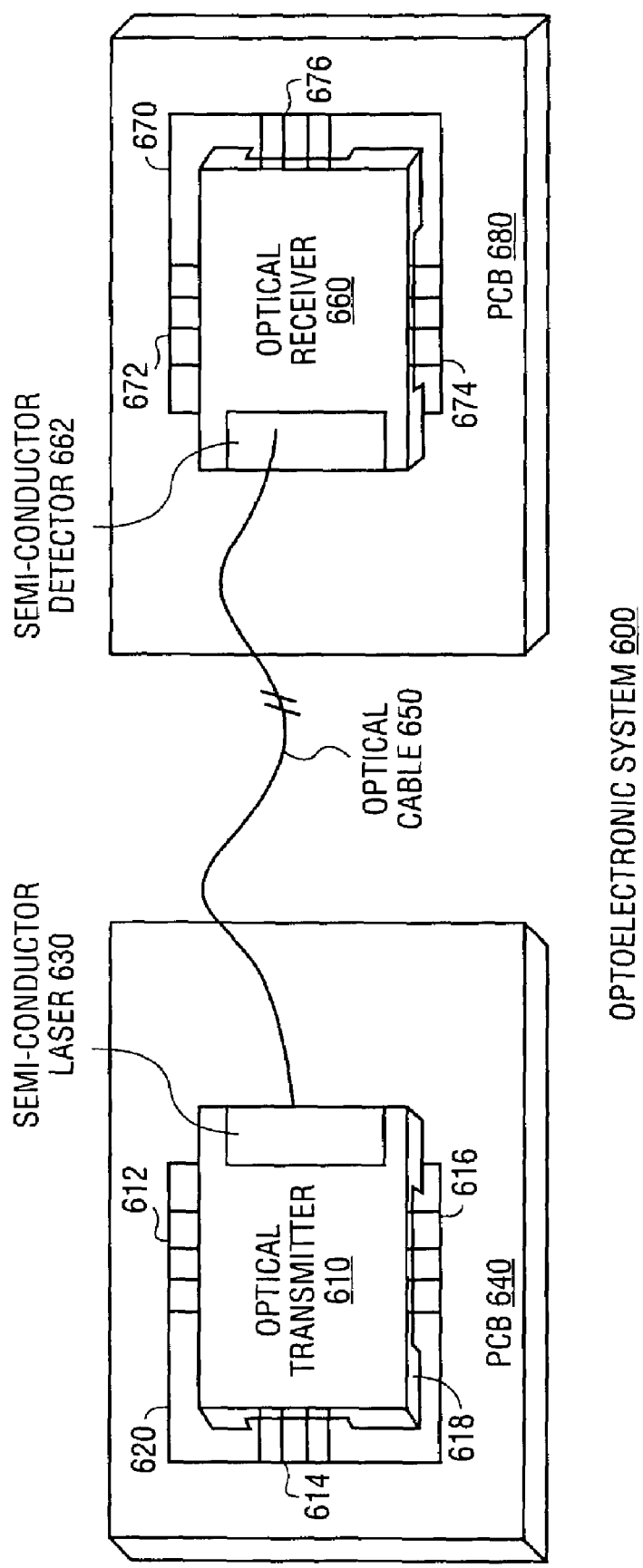
FIG. 8 illustrates one embodiment of an optical electronic system.

FIG. 8 illustrates one embodiment of an optical electronic system. System 600 includes optical transmitter 610 which is, for example, the transmitter described above having a vertical transmission line. Optical transmitter 610 is coupled to printed circuit board 640 via lead frame 620. In one embodiment, optical package 610 is configured as a transmitter, which includes semiconductor laser 630. Optical transmitter 610 communicates via semiconductor laser 630, while transmitting optical signals via optical cable 650. The optical signals are received by optical receivers 660.

Optical package 660 is configured as an optical receiver, which utilizes a lead frame 670 in order to form an electrical connection to PCB 680. In order to receive optical signals, optical receiver 660 includes a semiconductor detector 662. The semiconductor detector 662 receives an optical signal from optical cable 650 and converts the optical signal into its original electrical signal format. Signals can be transmitted within the receiver using a vertical transmission line as described above.

Other applications include the use of these teachings in line cards or a tranceiver/transponder, as well as other applications.

Figure 9:
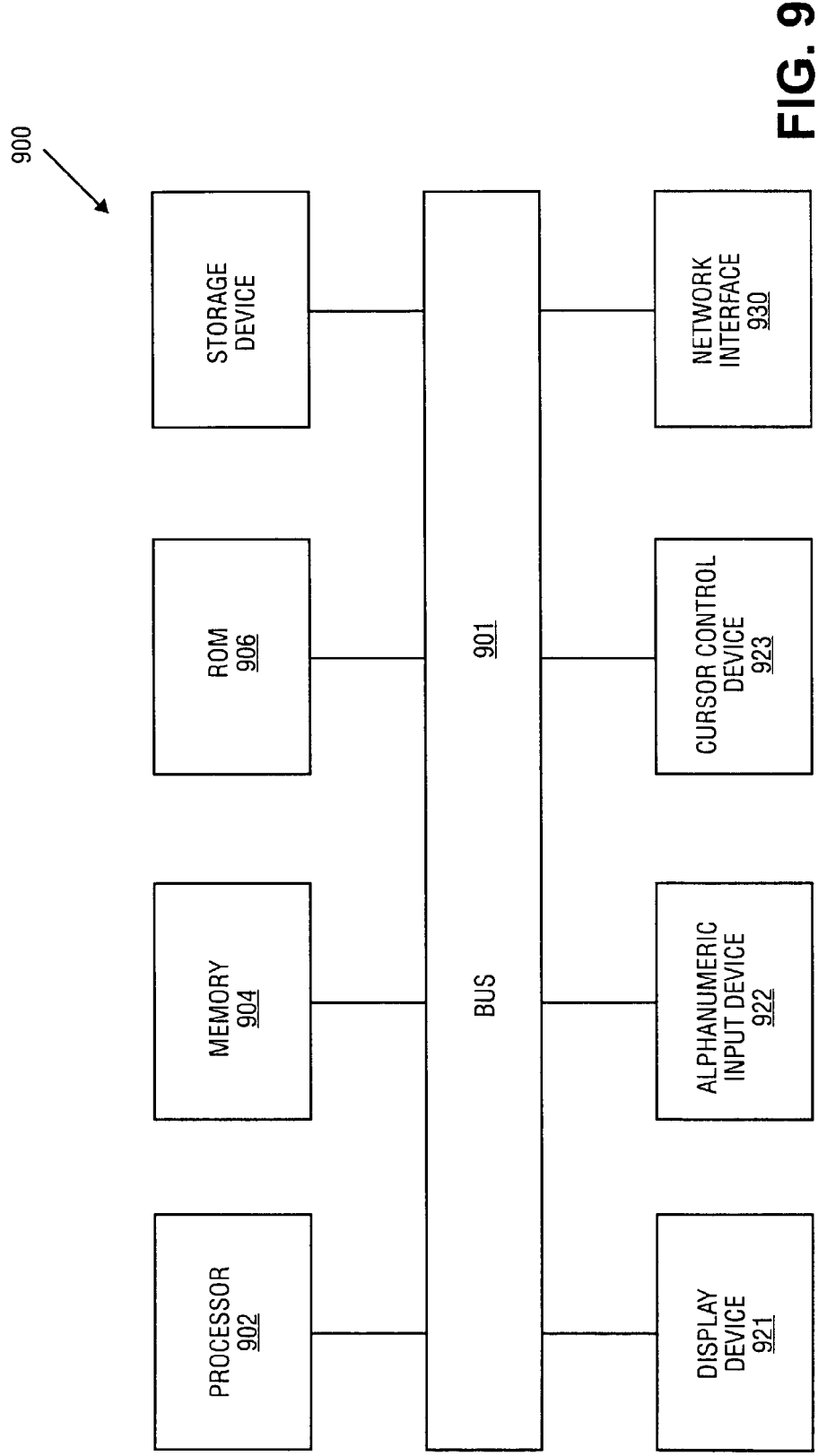
FIG. 9 is a block diagram of one embodiment of an electronic system.

In one embodiment, the optical transmitter and the optical receiver are components within an electronic system. FIG. 9 is a block diagram of one embodiment of an electronic system. The electronic system illustrated in FIG. 9 is intended to represent a range of electronic systems, for example, computer systems, network access devices, etc. Alternative systems, whether electronic or non-electronic, can include more, fewer and/or different components.

Electronic system 900 includes bus 901 or other communication device to communicate information, and processor 902 coupled to bus 901 to process information. In one embodiment, one or more lines of bus 901 are optical fibers that carry optical signals between components of electronic system 900. One or more of the components of electronic system 900 having optical transmission and/or optical reception functionality can provide a vertical transmission line to connect electronic circuitry to optical devices.

While electronic system 900 is illustrated with a single processor, electronic system 900 can include multiple processors and/or co-processors. Electronic system 900 further includes random access memory (RAM) or other dynamic storage device 904 (referred to as memory), coupled to bus 901 to store information and instructions to be executed by processor 902. Memory 904 also can be used to store temporary variables or other intermediate information during execution of instructions by processor 902.

Electronic system 900 also includes read only memory (ROM) and/or other static storage device 906 coupled to bus 901 to store static information and instructions for processor 902. Data storage device 907 is coupled to bus 901 to store information and instructions. Data storage device 907 such as a magnetic disk or optical disc and corresponding drive can be coupled to electronic system 900.

Electronic system 900 can also be coupled via bus 901 to display device 921, such as a cathode ray tube (CRT) or liquid crystal display (LCD), to display information to a computer user. Alphanumeric input device 922, including alphanumeric and other keys, is typically coupled to bus 901 to communicate information and command selections to processor 902. Another type of user input device is cursor control 923, such as a mouse, a trackball, or cursor direction keys to communicate direction information and command selections to processor 902 and to control cursor movement on display 921. Electronic system 900 further includes network interface 930 to provide access to a network, such as a local area network. In one embodiment, network interface 930 provides an interface to an optical network by including an optical transmitter having a vertical transmission line and/or an optical receiver having a vertical transmission line as described in greater detail above.

Instructions are provided to memory from a storage device, such as magnetic disk, a read-only memory (ROM) integrated circuit, CD-ROM, DVD, via a remote connection (e.g., over a network via network interface 930) that is either wired or wireless providing access to one or more electronically-accessible media, etc. In alternative embodiments, hard-wired circuitry can be used in place of or in combination with software instructions. Thus, execution of sequences of instructions is not limited to any specific combination of hardware circuitry and software instructions.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. An apparatus comprising:
  an electrical component;
  a riser having a transmission line patterned thereon, the transmission line coupled with the electrical component, the transmission line traversing from at least a first plane to at least a second plane; and
  an optoelectronic component disposed atop the riser, the optoelectronic component coupled with the transmission line to communicate signals with the electrical component.

2. The apparatus of claim 1 wherein the interface receives high-frequency signals between 9 kHz and 300 GHz.

3. The apparatus of claim 1 wherein the riser comprises a thick film riser.

4. The apparatus of claim 1 wherein the transmission line comprises one or more metal lines printed on the riser.

5. The apparatus of claim 1 wherein the transmission line comprises a single-ended transmission line.

6. The apparatus of claim 1 wherein the transmission line comprises a differential transmission line.

7. The apparatus of claim 1 wherein the optoelectronic component and the riser are disposed within a hermetically sealed package.

8. The apparatus of claim 1 wherein the optoelectronic component comprises one or more of: a laser diode, a photodetector, and an amplifier.

9. An apparatus comprising:
  a first level having an interface at which one or more electrical signals are at least one of received and transmitted;
  a second level having of at least one of an electronic, optical, and optoelectronic component; and
  a riser disposed between the first level and the second level, the riser having a transmission line patterned thereon providing an electrical connection between the interface on the first level and the at least one of an electronic, optical, and optoelectronic component on the second level.

10. The apparatus of claim 9 wherein the first level is substantially parallel to the second level.

11. The apparatus of claim 9 wherein the riser comprises a thick film riser.

12. The apparatus of claim 9 wherein the riser comprises a ceramic riser.

13. The apparatus of claim 9 wherein the transmission line comprises one or more metal lines printed on the riser.

14. The apparatus of claim 9 wherein the transmission line comprises a single-ended transmission line.

15. The apparatus of claim 9 wherein the transmission line comprises a differential transmission line.

16. The apparatus of claim 9 further comprising a second transmission line coupled between the first level and the second level.

17. The apparatus of claim 9 wherein the first level, the second level, and the riser are disposed within a hermetically sealed package.

18. The apparatus of claim 9 wherein the optical component comprises one or more of: a laser diode, a photodetector, and an amplifier.

19. An apparatus comprising:
one or more electrical components on a first plane;
one or more optical components on a second plane;
a riser disposed between the electrical components and the optical components; and
a transmission line printed on the riser providing a connection between the electrical components of the optical components.

20. The apparatus of claim 19 wherein the first plane is substantially parallel to the second plane.

21. The apparatus of claim 19 wherein the electrical components, the optical components, the riser, and the transmission line for providing an electrical connection between the electrical components and the optical components are disposed within a hermetically sealed package.

22. The apparatus of claim 19 wherein the one or more electrical components comprise a die having an integrated circuit.

23. The apparatus of claim 19 wherein the one or more optical components comprise one or more of: a laser diode, a photodetector, and an amplifier.

24. An apparatus comprising:
a substrate having a plurality of lead pins to provide a high frequency interface; a riser disposed atop the substrate; and
one or more optical components disposed atop the riser, the one or more optical components coupled with the electrical interface by at least a transmission line patterned on the riser.

25. The apparatus of claim 24 further comprising a cap and a seal ring attached to the substrate to provide a hermetically sealed environment for the riser, the one or more optical components and the transmission line.

26. The apparatus of claim 24 further comprising the one or more electrical components disposed atop the substrate that comprise a die having an integrated circuit.

27. A system comprising:
a transmitting device having one or more electrical components on a first plane, one or more optical components on a second plane to transmit optical signals, a riser disposed between the electrical components and the optical components;
an optical communications medium to carry signals transmitted by the optical component of the transmitting device;
a receiving device having one or more electrical components on a first plane, one or more optical components on a second plane to receive optical signals, a riser disposed between the electrical components and the optical components; and
the riser of at least one of the transmitting device or the receiving device having a transmission line patterned thereon providing an electrical connection between the first plane and the second plane of the at least one of the transmitting device or the receiving device.

28. The system of claim 27 wherein the transmitting device is a processor and the receiving device is a memory.

29. The system of claim 27 wherein the transmitting device is a memory and the receiving device is a processor.

30. A system comprising:
a transmitting device having one or more electrical components on a first plane, one or more optical components on a second plane to transmit optical signals to a remote device, and a riser disposed between the electrical components and the optical components;
an optical communications medium to carry signals transmitted by the optical component of the transmitting device;
a receiving device having one or more electrical components on a first plane, one or more optical components on a second plane to receive optical signals from the remote device, and a riser disposed between the electrical components and the optical components; and
the riser of at least one of the transmitting device or the receiving device having a transmission line patterned thereon providing an electrical connection between the first plane and the second plane of the at least one of the transmitting device or the receiving device.

31. The system of claim 30 further comprising a bus coupled with the transmitting device and with the receiving device, the bus to provide a communications path between the transmitting device and a processor and between the processor and the receiving device.

32. The apparatus of claim 30 wherein the one or more electrical components comprise a die having an integrated circuit.

33. The apparatus of claim 5 wherein the single-ended transmission line comprises a first ground line, signal line and a second ground line.

34. The apparatus of claim 1 further comprising an interface having a plurality of pins to receive signals from an external source, the electrical component being coupled with the interface to operate on electrical signals.

35. The apparatus of claim 34 wherein the electrical component is disposed upon the first plane.

36. The apparatus of claim 34 wherein the electrical component is disposed upon the second plane.

* * * * *